United States Patent
van Zwol et al.

(10) Patent No.: US 9,508,021 B2
(45) Date of Patent: *Nov. 29, 2016

(54) LOGO OR IMAGE RECOGNITION

(71) Applicant: Yahoo! Inc., Sunnyvale, CA (US)

(72) Inventors: Roelof van Zwol, San Jose, CA (US); Lluis Garcia Pueyo, San Francisco, CA (US); Stefan Matthias Romberg, Augsburg (DE)

(73) Assignee: Yahoo! Inc., Sunnyvale, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/158,598

(22) Filed: Jan. 17, 2014

(65) Prior Publication Data

US 2014/0133763 A1 May 15, 2014

Related U.S. Application Data (63) Continuation of application No. 13/088,305, filed on Apr. 15, 2011, now Pat. No. 8,634,654.

(51) Int. Cl.
*G06K 9/64* (2006.01)
*G06K 9/62* (2006.01)

(52) U.S. Cl.
CPC ........... *G06K 9/6202* (2013.01); *G06K 9/6211* (2013.01)

(58) Field of Classification Search
None
See application file for complete search history.

(56) References Cited

U.S. PATENT DOCUMENTS

| | | | |
|---|---|---|---|
| 4,956,870 A | 9/1990 | Hara | |
| 5,444,791 A | 8/1995 | Kamada et al. | |
| 5,524,161 A | 6/1996 | Omori et al. | |
| 5,719,959 A | 2/1998 | Krtolica | |
| 6,041,133 A | 3/2000 | Califano et al. | |
| 6,072,895 A | 6/2000 | Bolle et al. | |
| 6,315,197 B1 * | 11/2001 | Beardsley | G06K 7/12 235/381 |
| 6,325,287 B1 | 12/2001 | Nakajima et al. | |
| 6,343,150 B1 | 1/2002 | Darrell et al. | |
| 6,591,011 B1 * | 7/2003 | Nielsen | G06K 9/6211 382/194 |
| 6,650,776 B2 | 11/2003 | Ihara et al. | |
| 6,920,231 B1 | 7/2005 | Griffin | |
| 7,142,714 B2 | 11/2006 | Ihara et al. | |
| 7,424,155 B2 | 9/2008 | Ihara et al. | |
| 7,542,881 B1 | 6/2009 | Billiotte et al. | |
| 7,783,135 B2 * | 8/2010 | Gokturk | G06F 17/30253 382/209 |
| 7,787,711 B2 * | 8/2010 | Agam | G06K 9/00161 358/403 |
| 7,809,192 B2 * | 10/2010 | Gokturk | G06F 17/30253 382/176 |
| 7,813,561 B2 * | 10/2010 | Jia | G06F 17/30247 382/155 |
| 7,962,500 B2 | 6/2011 | Van Zwol et al. | |
| 8,019,162 B2 | 9/2011 | Zhang et al. | |

(Continued)

OTHER PUBLICATIONS

Scale and Affine invariant interest point detectors—Mikolajczyk—2003.*

(Continued)

*Primary Examiner* — Chan Park
*Assistant Examiner* — Iman K Kholdebarin
(74) *Attorney, Agent, or Firm* — Berkeley Law & Technology Group, LLP (57) ABSTRACT

Subject matter disclosed herein relates to electronic image object or logo recognition.

16 Claims, 5 Drawing Sheets

(56) References Cited

U.S. PATENT DOCUMENTS

| | | | |
|---|---|---|---|
| 8,131,118 B1 | 3/2012 | Jing et al. | |
| 8,144,368 B2 | 3/2012 | Rodriguez et al. | |
| 8,253,802 B1* | 8/2012 | Anderson | G06T 7/0089 348/169 |
| 8,320,706 B2* | 11/2012 | Kim | H04N 1/2166 348/231.3 |
| 8,345,979 B2 | 1/2013 | Davis | |
| 8,358,840 B2 | 1/2013 | Bronstein et al. | |
| 8,417,037 B2 | 4/2013 | Bronstein et al. | |
| 8,559,681 B2* | 10/2013 | Benini | G06K 9/00885 235/382 |
| 8,634,654 B2 | 1/2014 | van Zwol | |
| 2002/0057838 A1 | 5/2002 | Steger | |
| 2004/0202355 A1* | 10/2004 | Hillhouse | G06K 9/00087 382/124 |
| 2005/0088515 A1* | 4/2005 | Geng | G06T 7/0077 348/47 |
| 2005/0105804 A1* | 5/2005 | Francos | G06K 9/6203 382/215 |
| 2006/0104484 A1* | 5/2006 | Bolle | G06K 9/00885 382/115 |
| 2006/0159316 A1 | 7/2006 | Chisamore et al. | |
| 2006/0251292 A1* | 11/2006 | Gokturk | G06F 17/30253 382/103 |
| 2007/0036400 A1 | 2/2007 | Watanabe et al. | |
| 2007/0088953 A1* | 4/2007 | Hilton | G07D 7/0026 713/176 |
| 2007/0179921 A1 | 8/2007 | Zitnick et al. | |
| 2008/0273770 A1 | 11/2008 | Kohout | |
| 2008/0279481 A1 | 11/2008 | Ando | |
| 2009/0041340 A1 | 2/2009 | Suzuki et al. | |
| 2009/0092336 A1* | 4/2009 | Tsurumi | G06K 9/3216 382/294 |
| 2009/0175538 A1 | 7/2009 | Bronstein et al. | |
| 2009/0196510 A1* | 8/2009 | Gokturk | G06F 17/30253 382/224 |
| 2009/0284527 A1 | 11/2009 | Ofek et al. | |
| 2009/0319388 A1 | 12/2009 | Yuan et al. | |
| 2010/0002915 A1 | 1/2010 | Govan | |
| 2010/0014756 A1 | 1/2010 | Kato et al. | |
| 2010/0067752 A1* | 3/2010 | Vestgote | G06K 9/00073 382/125 |
| 2010/0080425 A1 | 4/2010 | Bebis et al. | |
| 2010/0092093 A1 | 4/2010 | Akatsuka et al. | |
| 2010/0098324 A1* | 4/2010 | Fujieda | B25J 9/1697 382/154 |
| 2010/0104184 A1 | 4/2010 | Bronstein et al. | |
| 2010/0232643 A1* | 9/2010 | Chen | G06K 9/4671 382/103 |
| 2010/0232709 A1 | 9/2010 | Zhang et al. | |
| 2010/0299355 A1 | 11/2010 | Shiyama et al. | |
| 2011/0019921 A1 | 1/2011 | Hamada | |
| 2011/0129155 A1 | 6/2011 | Oami et al. | |
| 2011/0311110 A1 | 12/2011 | Benini | |
| 2011/0317922 A1* | 12/2011 | Chertok | G06K 9/4671 382/180 |
| 2011/0320317 A1 | 12/2011 | Yuan et al. | |
| 2012/0002880 A1 | 1/2012 | Lipson et al. | |
| 2012/0045095 A1 | 2/2012 | Tate et al. | |
| 2012/0093400 A1 | 4/2012 | Saito | |
| 2012/0114254 A1 | 5/2012 | Nakjima | |
| 2012/0134576 A1* | 5/2012 | Sharma | G06K 9/4604 382/155 |
| 2012/0140996 A1 | 6/2012 | Hara et al. | |
| 2012/0195478 A1* | 8/2012 | Hsu | G06K 9/00093 382/125 |
| 2012/0263385 A1 | 10/2012 | Van Zwol et al. | |
| 2013/0089260 A1 | 4/2013 | Pires et al. | |

OTHER PUBLICATIONS

Object recognition by affine invariant matching—Lamdan—1998.*
Romberg et al—ICMR2011_Scalable_Logo_Recognition_in_Real-World_Images Apr. 18, 2011.*
Affine invariant model based object recogition using robust metrics—Zografos 2005.*
Bronstein, Spatially-sensitive affine-invariant image descriptors, Computer Vision—ECCV 2010 Lecture Notes in Computer Science col. 6312, 210, pp. 197-208.
Irani, Combinatorial and Experimental Results for Randomized Point Matching Algorithms, Proceedings of the Twelfth annual symposium on Computational Geometry, pp. 68-77, 1996.
Irani, Combinatorial and experimental results for randomized point matching algorithms, Dec. 1999, Elsevier, Computational geometry 12 (1999) 17-31.
Krystian Mikolajczyk, Scale & Affine Invariant Interest Point Detectors, International Journal of Computer Vision 60(1), 63-86, 2004.
Landan, Object Recognition by Affine Invariant Matching, 1988, IEEE.
Lamdan, Schwartz, et al. Affine Invariant Model Based Object Recognition, 1990, IEEE Transactions on Robotics and Automation vol. 6, No. 5, Oct. 1990.
Pope, Model-Based Object Recognition A Survey of Recent research, 1994, technical report.
Rothganger, 3D Object Modeling and Recognition Using Local Affine-Invariant Image Descriptors and Multi-View Spatial Constraints, International Journal of Computer Vision 66, 3 (2006) 231-259.
Tuytelaars, Matching Widely Separated Views Based on Affine Invariant Regions, international Journal of Computer Vision 59(1), 61-85, 2004.
U.S. Appl. No. 13/088,305, filed on Apr. 15, 2011, 38 Pages.
U.S. Appl. No. 13/088,305 / Filing Receipt, Mailed May 2, 2011, 3 pages.
U.S. Appl. No. 13/088,305 / Notice of Publication, Mailed Oct. 18, 2012, 1 Page.
U.S. Appl. No. 13/088,305 / Non-Final Office Action, Mailed Dec. 18, 2012, 12 Pages.
U.S. Appl. No. 13/088,305 / Non-Final Office Action Response, Mailed Mar. 6, 2013, 23 Pages.
U.S. Appl. No. 13/088,305 / Final Office Action, Mailed May 21, 2013, 20 Pages.
U.S. Appl. No. 13/088,305 / Request for Continued Examination, mailed Aug. 21, 2013, 45 Pages.
U.S. Appl. No. 13/088,305 / Notice of Allowance and Fees Due (PTO-85), Mailed Sep. 16, 2013, 11 Pages.
U.S. Appl. No. 13/088,305 / Issue Fee Payment (PTO-85B), Mailed Dec. 16, 2013, 5 Pages.
U.S. Appl. No. 13/088,305 / Issue Notification, Mailed Dec. 31, 2013, 1 Page.
U.S. Appl. No. 14/325,192 / Application as filed Jul. 7, 2014, 82 pages.
U.S. Appl. No. 14/325,192 / Filing Receipt, mailed Jul. 21, 2014, 3 pages.

* cited by examiner

LOGO OR IMAGE RECOGNITION

BACKGROUND

Field

Subject matter disclosed herein relates to electronic image object or logo recognition.

Information

Enabling electronics to recognize objects in images has been a goal of computer vision for decades. Though there has been much progress toward this goal, the task remains challenging. For example, recognizing particular objects transferred across the Internet may involve processing an enormous amount of image information at a relatively high rate. Users of a popular social media website may upload more than 4000 images per minute. Accordingly, it may be desirable to search for or recognize particular objects, such as logos, in an image at a relatively high rate.

BRIEF DESCRIPTION OF THE FIGURES

Non-limiting or non-exhaustive embodiments will be described with reference to the following figures, wherein like reference numerals refer to like parts throughout various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

In an embodiment, a process for electronic recognition of particular patterns in images, such as logos, for example, may involve techniques for recognizing similarities among two or more images. For example, local features of a sample image may be compared to local features of one or more reference images to determine if local features of the sample image comprise a particular pattern to be recognized. Electronic recognition may, for example, be used to select advertisements based, at least in part, on identifying a recognized object or logo, though claimed subject matter is not so limited.

Although examples herein focus on techniques to recognize logos, logo recognition may be considered a subset of object or pattern recognition. Typically, logos may be considered to be objects having a planar surface. Accordingly, although embodiments described may apply to logos, images, patterns, or objects, claimed subject matter is not limited in this respect. A process of computer recognition may be applied to recognizing a logo, a geometrical pattern, an image of a building in a photo, lettering, a landscape in a photo, or other such object of an image or photo, just to name a few examples.

Figure 1:
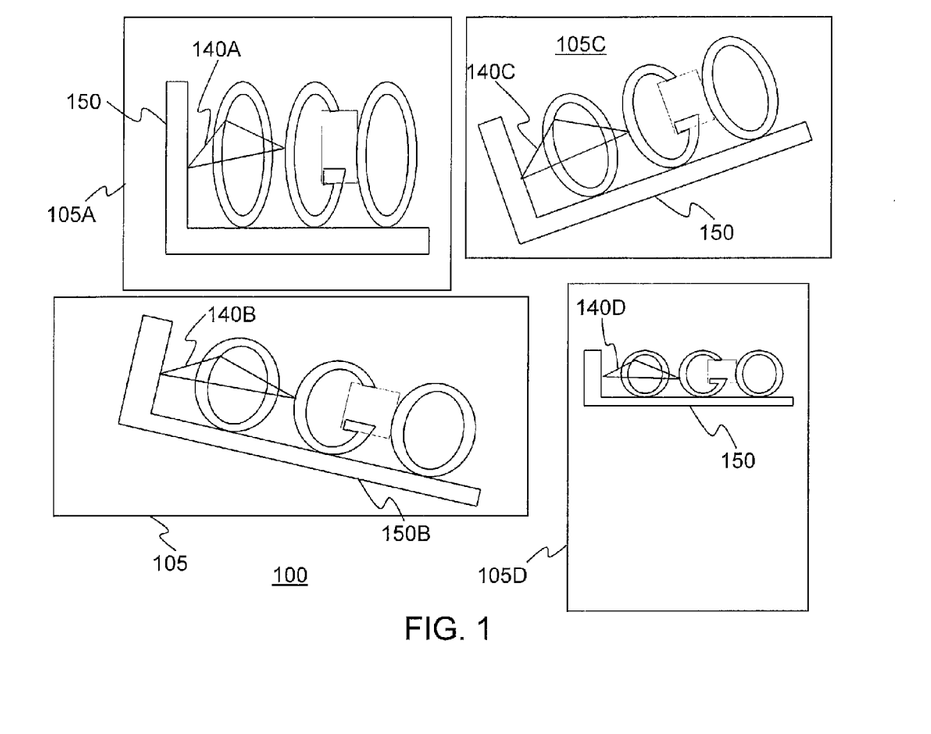
FIG. 1 shows various orientations of a logo, according to an embodiment.

Electronic signals representing information describing local features in a plurality of reference images that comprise logos may be extracted from the images. Information describing local features in an image may comprise image descriptors. Electronic signals representing image descriptors of reference images may be stored and used during a process to recognize a logo or other object in a sample image. Information signals may be collected into one or more indexes, as described below. In a particular implementation, a plurality of reference images including logos may comprise a collection of logo-classes. A logo-class may comprise two or more reference images of a particular logo, for example. Various views, perspectives, or sizes of a particular logo may be shown by one or more reference images. In other words, a logo-class may comprise two or more examples of a particular logo. Among other things, FIG. 1 shows an example of a logo-class 100 of reference images 105A-D that include several views of a logo 150A-D in different perspectives or having different sizes. Further aspects of FIG. 1 are discussed below.

A process of searching for a matching logo in a plurality of reference images that may correspond to a logo in a sample image may include determining whether or which local features in the sample image are similar to local features in the reference images. For example, two images containing similar-appearing regions or areas may have similar spatial layout of local features. In other words, within these regions positions of local features relative to one another may be approximately the same for both images, regardless of image orientation, scale, or size of the region. Local features may comprise geometric patterns such as, for example, lines, edges, triangles, or polygons, as explained below.

Stable points of an image may comprise electronic states or signals representing selected groups of image points that are substantially invariant under rotation of the image, substantially invariant for size or scale changes of the image, or substantially invariant under affine transformations. For example, pairs of stable points may be combined or grouped together to form edges (e.g., line segments) corresponding to local features of an image. Edges may have particular properties that, like stable points, are also substantially invariant under rotation or scale change. Additionally, edges may be combined into larger groups to form polygons having particular properties that are also substantially invariant under rotation or scale change. For example, edges may be combined into larger groups to form triangles. As explained in detail below, edges or triangles, with their associated invariant properties, may act as an identifier of a logo or other object in an image. In one implementation, an edge or triangle may comprise electronic states representing a multi-dimensional vector having from several to a many as several hundred components, as described below.

In an embodiment, as mentioned above, a process of recognizing a logo in a sample image may involve comparing the logo to a plurality of reference images that include the logo. A logo of a reference image may be represented by edges or triangles; a collection of logos may be represented by an index or table of edges or triangles. Thus, particular combinations of edges or triangles may be associated with particular logos. In one implementation, an edge index and a triangle index may be used individually, as described below. An edge index, for example, stored on a memory device, may comprise electronic states representing hundreds of thousands of combinations of edges or triangles and a triangle index may comprise electronic states representing millions of combinations of edges or triangles. Though edges and triangles are discussed in these examples, other geometric combinations of stable points may be considered, such as polygons, and stable points of geometric combinations need not be connected by edges, for example. Of course, details regarding indexes, such as type or size, are merely examples, and claimed subject matter is not so limited.

In an embodiment, a process of recognizing an object in an image may involve a hierarchical or cascaded approach, wherein quantized local features, explained below, of the object may be searched in indexes in an iterative fashion. For example, quantized local features of an object may be searched in an edge index before proceeding to a triangle index. A cascaded approach may provide a number of benefits, such as breaking a search process into smaller, relatively manageable parts, for example. A cascaded approach may allow for relatively fast searches that may be relatively accurate, as described below. In one implementation, a cascaded approach may involve one or more cascaded indexes to provide relatively fast access to relatively complex geometrical structures in images. For example, a search for particular polygons may comprise searching for parts of the polygons before proceeding to search for whole polygons.

A cascaded index may include both lower-dimensional and higher-dimensional feature representations, which may be linked so that lower-dimensional feature representations comprise parts of higher-dimensional representations. An index structure may allow scanning of relatively sparsely populated high-dimensional feature space by first determining a lower-dimensional subspace which is part of a higher-dimensional space.

To create an organized collection of stored information states regarding logos, multiple reference images for individual logo-classes may be collected, as explained above. From reference images, electronic signals representing region detection features may be extracted using any of a number of techniques, such as a Harris-Laplace detector or a hessian-affine detector. Region detection features may be described using descriptors such as the scale-invariant feature transform (SIFT), to detect or describe local features in images. Other descriptors may include speeded up robust features (SURF), histogram of oriented gradients (HoG), gradient location orientation histogram (GLOH), or color SIFT, just to name a few examples.

Extracted local features may comprise properties that allow local features to be detectable under changes in image scale, noise, or illumination, for example. Local features, which may comprise electronic states representing points that lie on relatively high-contrast regions of an image, such as object edges, may be more robust to image tilt or affine transformations than other features in the image. Electronic states representing local features may be transformed to quantize the local features or descriptors to discrete visual "words" or labels that form a "vocabulary" derived by k-means clustering. Edges, for example, may comprise two visual words. In one implementation, a vocabulary may be relatively small, comprising perhaps several thousand visual words, though claimed subject matter is not so limited.

In an embodiment, a logo-class may be generated from two or more reference or training images. A systematic search for edges in one training image that are similar to edges in another training image may be performed. Edges that are similar in training images are described as edges that "match across" training images. Edges that are determined to match across training images for a logo-class may be collected into an edge index that includes matching edges for a plurality of logo-classes. In a subsequent hierarchical portion of a process to index or categorize logo-classes, triangles may be formed by systematically combining edges that match across training images with third points that also match across training images. In one implementation, a triangle representation may be stored in a memory device as electronic states or signals that represent a 64-bit integer, for example. Triangles that are determined to match across training images for a logo-class may be collected into a triangle index that includes matching triangles for a plurality of logo-classes. In a particular implementation, a technique to determine corresponding points on pairs of training images may involve estimating the homography of pairs of training images using random sample consensus (RANSAC). For example, RANSAC may be used to derive corresponding points from training images, after which triangle signatures may be created and their representations stored within a cascaded index.

To determine whether a logo is included in a sample image, and if so, to identify the logo, edges or triangles in the sample image may be determined and compared to contents in edge or triangle indexes. Edge or triangle indexes may be generated from training images of a number of logo-classes. A logo in a sample image may be identified if the particular logo is represented by any of the logo-classes.

To represent a certain logo class, electronic states representing n training images may be selected and matching triangles may be determined for any combination of the training images. That is, if there are n images per class, n(n−1)/2 image pairs may be matched per class. Matching triangles may form a logo class.

For relatively many image pairs, a matching procedure may not be able to find matching triangles. This may result from an inability of image local features to be robust against relatively large tilts. In addition, relatively many logos may be situated on a reflecting background, which may distort image local features, for example. However, images that may not match one image might still be matched to another image. Thus, even if matching fails in some cases (e.g., as a result of challenging image pairs or variability of features), matches across different images may occur. For example, matching may fail for logos where colors are inverted. Of course, details regarding a matching procedure are merely examples, and claimed subject matter is not so limited.

FIG. 1 shows various orientations or views of a logo 150 included in image representations 105A-D, according to an embodiment 100. Image representations 105A-D may comprise training images for a particular logo-class, for example. Several views of logo 150 show different perspectives or different sizes of the logo. For example, while logo 150 may be oriented at least approximately horizontal in image representations 105A and 105D, logo 150 may be rotated or shown in a perspective view in image representations 105B and 105C. For example, logo 150 in image representation 105A may comprise an object in a photo of a logo that was facing a camera. As a counter-example, logo 150 in image representation 105C may comprise an object in a photo of a logo that was oriented at an angle to a camera. Despite various orientations, scales, or other qualities of logo 150, particular points, edges, polygons or triangles 140A-D may be determined or generated so that they are substantially invariant to changes in orientation or scale of logo 150. For example, and as explained in greater detail below, particular properties of triangles 140A-D, or points or edges (e.g., lines) of which the triangles are comprised, may be substantially invariant to changes in orientation or scale of logo 150. Thus, for example, properties of triangle 140A may be substantially similar to those of triangle 140B, 140C, or 140D, regardless of varying orientation or scale. Of course, examples of logos and other features are merely examples, and claimed subject matter is not so limited.

Figure 2:
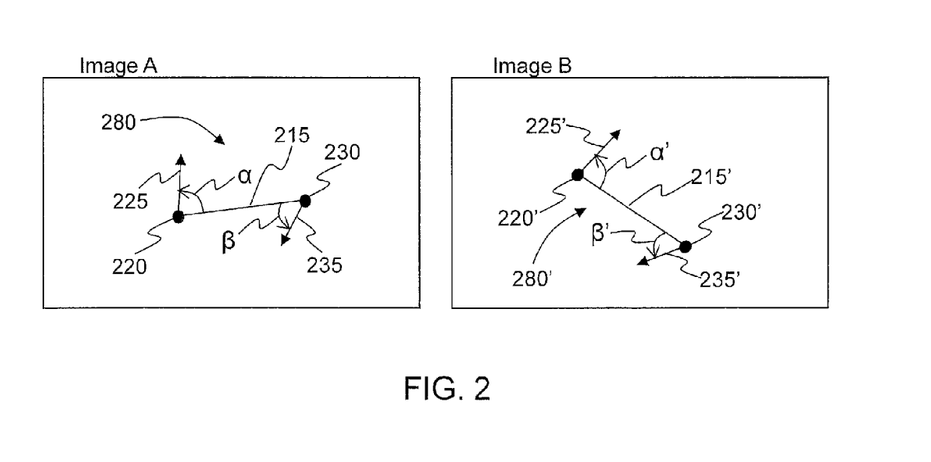
FIG. 2 illustrates parameters of an edge in different images, according to an embodiment.

FIG. 2 illustrates parameters of an edge in different images, according to an embodiment. As explained above, an edge may comprise a pair of stable points or local features, though claimed subject matter is not limited in this respect. Image A, which may comprise a photo, may include a number of objects (not shown). If Image A comprises a training image, then a logo may be included among the objects. If Image A comprises a sample image, then a logo need not be present: determining whether a logo is present or identification of a logo may be goals of techniques described herein. Region detector features or descriptors, which may comprise points or combinations of points, may be determined using any of a number of techniques, as described above, such as SIFT, for example. Descriptors may have invariant properties that allow the descriptors to be detectable under changes in scale of the underlying image area or object, rotation, noise, or illumination, for example. Descriptors, which may comprise points that lie on relatively high-contrast regions of an image, such as object edges, may be more robust to image tilt or other transformations than other descriptors in the image. In an implementation, descriptors may be grouped into pairs of points. As an example, points 220 and 230, which may comprise descriptors having invariant properties, may be grouped into a pair 280. Parameters of pair 280 may be defined to subsequently characterize or quantize pair 280 to generate a visual word or edge. Accordingly, point 220 may include a direction vector 225 and point 230 may include a direction vector 235. A direction vector may be defined, for example, using an angle of a counterclockwise offset from an edge. Orientation of a local feature may be derived from orientation of a region described by the local feature. An angle $\alpha$ may comprise an angle between direction vector 225 and a line 215 that connects points 220 and 230. An angle $\beta$ may comprise an angle between direction vector 235 and line 215.

Image B, which, as in the case for Image A, may comprise a photo, may include a number of objects (not shown). Image B may comprise a training image that may be included in a logo-class with Image A, for example. Hessian-affine descriptors, which may comprise points, may be determined for Image B. Similar to the case for Image A described above, points 220' and 230', which may comprise descriptors having invariant properties, may be grouped into a pair 280'. Parameters of pair 280' may be defined to subsequently characterize or quantize pair 280' to generate a visual word or edge. Accordingly, point 220' may include a direction vector 225' and point 230' may include a direction vector 235'. An angle $\alpha'$ may comprise an angle between direction vector 225' and a line 215' that connects points 220' and 230'. An angle $\beta'$ may comprise an angle between direction vector 235' and line 215'.

To develop a logo-class of a logo using training images, a plurality of pairs of points of quantized local features may be characterized as described above with reference to FIG. 2. After quantizing pairs of points and forming edge signatures, a process may be performed to determine which edges match across training images of a logo-class. For example, Image A may include tens of thousands of edges, though merely several hundred of these edges may match edges included in Image B. Of course, such numeric examples are merely provided for illustration, and are non-limiting. Images A and B may contain similar regions as well as similar spatial layout of descriptors of the regions. In other words, within these regions relative positions of descriptors with respect to one another may be roughly the same for both images. This may hold true regardless of orientation, scale, or size of the regions. Thus, it may be desirable to find pairs of points (i, j) that have at least approximately the same or matching visual words or similar relative orientations $\alpha$, $\beta$, for example.

In one embodiment, matching visual words of point pairs (i, j) may be found using parameters of the point pairs defined above, such as in FIG. 2, for example. Let $F_a$ be the set of descriptors (e.g., point pairs) in Image A and $F_b$ the set of descriptors in Image B. Then the expression $F_{a \times b} = \{(a, b) | a \in F_a, b \in F_b, \text{label}(a) = \text{label}(b)\}$ denotes a set of combinations of local descriptors of Image A with descriptors having similar or identical visual word labels of Image B. Matching point pairs (i, j) may be determined from among potentially-matching pairs $F_{a \times a\ b}$. Point pairs (i, j) that do not match across Images A and B may be discarded or ignored. Of course, details of a process or operations used to find matching point pairs are merely examples, and claimed subject matter is not so limited.

In a particular implementation, for two point pairs in Images A or B, a relative orientation of two points across both images may be determined by transforming electronic states to calculate a difference of relative angles (referring to FIG. 2):

$$\Delta\alpha = \alpha - \alpha'$$

$$\Delta\beta = \beta - \beta'$$

Electronic states representing an angle similarity score $s(\Delta\alpha)$ for descriptors pairs (i, j) in $F_{a \times b}$ may be determined. A similarity score $s(\Delta\alpha)$ may be based, at least in part, on a difference between orientations of i and i' and a relative positions of j and j', or between angles across Images A and B. A normalized score for a difference between two angles may be calculated. In one particular implementation, a similarity score $s(\Delta\alpha)$ may be determined by transforming electronic states using the following expression, though claimed subject matter is not so limited:

$s(\Delta\alpha) = \eta \exp(-\Delta\alpha^2/(2\sigma^2))$, where $\sigma$ may comprise empirical constants, for example. $s(\Delta\alpha)$ may yield a value that indicates the similarity of the angles $\alpha$ and $\alpha'$. $s(\Delta\alpha)$ may be empirically normalized or adjusted using the parameter $\sigma$. In one particular example $\sigma=8$, so that $s(\Delta\alpha)$ may have a relative maxima of 1.0 at 0° difference. With increasing $\Delta\alpha$, $s(\Delta\alpha)$ may relatively quickly or smoothly decrease toward zero for differences $\Delta\alpha$ larger than about 25° in a particular case, for example. Of course, claimed subject matter is not limited to any particular values or numbers.

While $s(\Delta\alpha)$ may be used to quantify a relative position of point j seen from point i, a symmetric similarity score $s(\Delta\beta)$ may describe a similarity from the view of point j relative to a position of point i, for example. A resulting symmetric score for an edge (i, j) may then be defined as: $\text{sim}_{edge}(i, j) = \text{sim}_{edge}(j, i) = s(\Delta\alpha) s(\Delta\beta)$.

In an implementation, $\text{sim}_{edge}(i, j)$ may relatively quickly drop toward 0 if one of the two angles, $\Delta\alpha$ or $\Delta\beta$, is not consistent (e.g., if β and β' are not approximately similar) across the two images. Though comparison of a difference of angles may yield a binary result (e.g., match or no match), use of a continuous score (e.g., slightly matching, strongly matching, and so on) may beneficially allow sorting matching edges by their match quality. For example, edges (i, j) that have a score $sim_{edge}(i, j)$ above a threshold $T_{sim}$ may be used to generate an initial edge set $E_{match}$. As a result, relatively many potential combinations of point pairs (i, j) of Images A and B may therefore be excluded from further computations. Remaining edges in edge set $E_{match}$ may match across the two images and serve as a starting point for further processing of spatial configurations, which may involve triangles, as described below.

As described above, pairs of points in an image together with the pairs' relative orientation with respect to the image may be treated as lines called edges. Two or more edges may be considered to be matching if their visual word labels or descriptors are substantially equal. For example, an edge in one image may be considered to be matching an edge in another image if the edges comprise points that match one another or if both edges have a spatial layout similar to one another. In a similar fashion, a group of points together with the group's relative orientation with respect to an image may be modeled as polygons. In a particular implementation, polygons may comprise triangles, for example. As in the case for edges, a triangle in one image may be considered to be matching a triangle in another image if the triangles comprise points that match one another or if both triangles have a spatial layout similar to one another.

Figure 3:
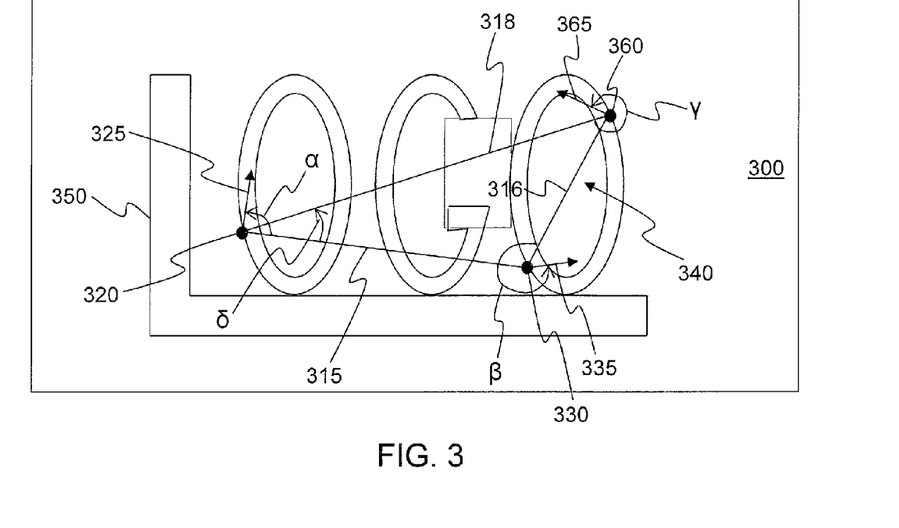
FIG. 3 illustrates parameters of a triangle in an image, according to an embodiment.

FIG. 3 illustrates parameters of a polygon comprising a triangle 340 in an image 300, according to an embodiment. Image 300, which may comprise a photo, may include a number of objects (not shown) other than a logo 350. If image 300 comprises a training image, then logo 350 may be included among the objects. On the other hand, if image 300 comprises a sample image, then a logo need not be present: determining whether a logo is present or identification of a logo may be goals of techniques described. In an implementation, triangle 340 may be generated by grouping a third point 360 to two points 320 and 330 of an edge shown as line 315. Parameters of points 320, 330, and 360 and their mutual relationship may be defined to subsequently characterize or quantize the group of three points to generate a triangle. Accordingly, point 320 may include a direction vector 325, point 330 may include a direction vector 335, and point 360 may include a direction vector 365. An angle α may comprise an angle between direction vector 325 and line 315 that connects points 320 and 330. An angle β may comprise an angle between direction vector 335 and line 316 that connects points 330 and 360. An angle γ may comprise an angle between direction vector 365 and line 318 that connects points 320 and 360. An angle δ may comprise an angle between line 315 and line 318. Of course, a choice of parameters to characterize a polygon or triangle is not limited to parameters described above, and claimed subject matter is not limited in this respect.

In a hierarchical step beyond describing objects in an image using edges, polygons, such as triangles, may be used to describe a spatial layout of objects. For example, spatial structure of point triplets of a first image may be indexed so that point triplets of a second image may be matched against this index, as described below. Triangles may be generated using edges and a third point as follows. Let $F_x = \{x | label(x) \in F_a \cap F_b\}$ be the set of local descriptors or points having visual word labels that match across first and a second images. Then a triangle (i, j, k) may be generated by selecting an edge (i, j) from the set of edges $E_{match}$ (discussed above) and a third point k from a set of points given by edges in $E_{match}$ (e.g., point k may comprise a part of an edge in $E_{match}$).

Returning to FIG. 3, information states or signals based, at least in part, on parameters of points 320, 330, and 360 may be used to create a signature for triangle 340. A triangle may be described by quantized components that form a signature, for example. In one particular implementation, triangle 340 may be described by eight quantized components that form a signature. Quantized components, for example, may comprise quantized labels for the three points (i, j, k) (e.g., 320, 330, and 360), quantized angle δ between edges (i, j) and (i, k), eccentricity or quantized proportion of the distances d(i, j)/d(i, k), or relative orientations α, β, and γ of points (i, j, k). A combination of angle δ and a proportion of distances d(i, j)/d(i, k) may be used to represent the shape of a triangle, though claimed subject matter is not so limited. A representation of a triangle may also include a scale value, which may be determined by an interest point detector, for example, given for local features.

In a process to generate a triangle signature, parameters of a triangle (e.g., angles or edge proportions), as shown in FIG. 3, may be formed into quantized components of the signature using quantizing bins having hard boundaries. Undesirably, bins having hard boundaries may introduce errors or potential loss of matches. To address this issue, a signature may be constructed for a triangle so that multiple signature variants may be generated. For example, four different angles or proportions of distances between points may be quantized to both a "first choice" bin and a "second choice" bin. In a particular application, for example, 32 $(=2^5)$ different signatures variants may be generated for a triangle.

To illustrate a particular example of quantizing components of a triangle signature, quantization of three orientation angles α, β, and γ of points (i, j, k) may be performed so that a bin size may be maintained at about 36°, for example. A bin size of eccentricity d(i, j)/d(i, k) may comprise a value of about 0.1 and a bin size of δ may be about 24°, for another example. Of course, these values are merely examples, and claimed subject matter is not so limited.

To reduce likelihood of inclusion of degenerated triangles in a triangle index, additional constraints may be imposed on points (i, j, k). If these constraints are not satisfied, a triangle may not be stored in an index, for example. Degenerated triangles that carry relatively little spatial information or are relatively non-descriptive may not be stored in an index. One additional constraint, for example, may impose that three points (i, j, k) are individually quantized to respectively different visual word labels. This constraint may stem from the fact that relatively many logos may include some kind of border. Along a border, relatively many local features may have similar descriptors and have a same label. Point triples including local features may not carry sufficient discriminative information. In addition, a spatial distance between points (i, j, k) may be above 5 pixels or a lower angle of the triangle of the point triples may be 15°. Both constraints may lead to discarded triangles where at least two points may be located relatively close to one other. In that case, a triangle may not describe spatial structure. Finally, eccentricity d(i, j)/d(i, k) may involve a constraint so that 0.1<d(i, j)/d(i, k)<10. This constraint may be reasonable as otherwise a triangle may not describe spatial structure. Of course, details of quantizing are merely examples, and claimed subject matter is not so limited.

Figure 4:
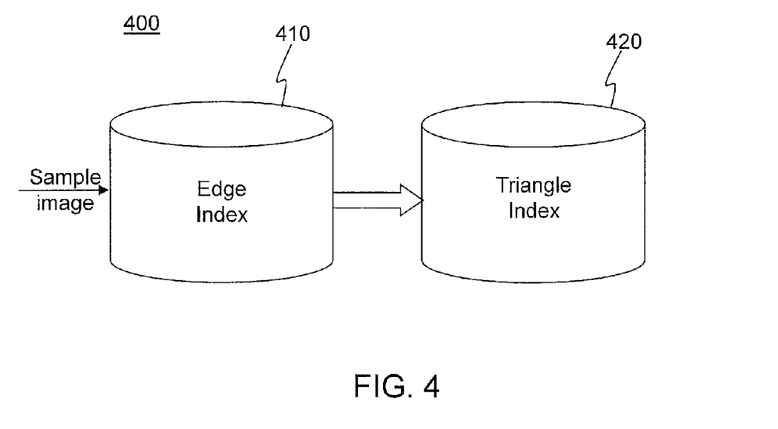
FIG. 4 shows a schematic diagram of a process to query an edge or triangle index, according to an embodiment.

FIG. 4 shows a schematic model of a process to query an edge or triangle index, according to an embodiment 400. As indicated above, geometric structure of an object or logo in an image may be indexed in a hierarchical or cascaded fashion. For example, an edge index 410 may contain quantized pairs of points (e.g., edges) that may represent a patch in a model of a logo-class. If a quantized pair of points from a sample image at least approximately matches an entry in an edge index, a subsequent triangle index 420 may be queried. A triangle index may comprise quantized triples of points forming an individual logo class. A technique that utilizes a cascaded index approach may provide a benefit in that the number of false positive classifications may be reduced compared to other techniques. For example, a logo may be identified with a false positive rate that is approximately or less than 1/200 that of a false negative rate, though claimed subject matter is not limited in this respect.

Figure 5:
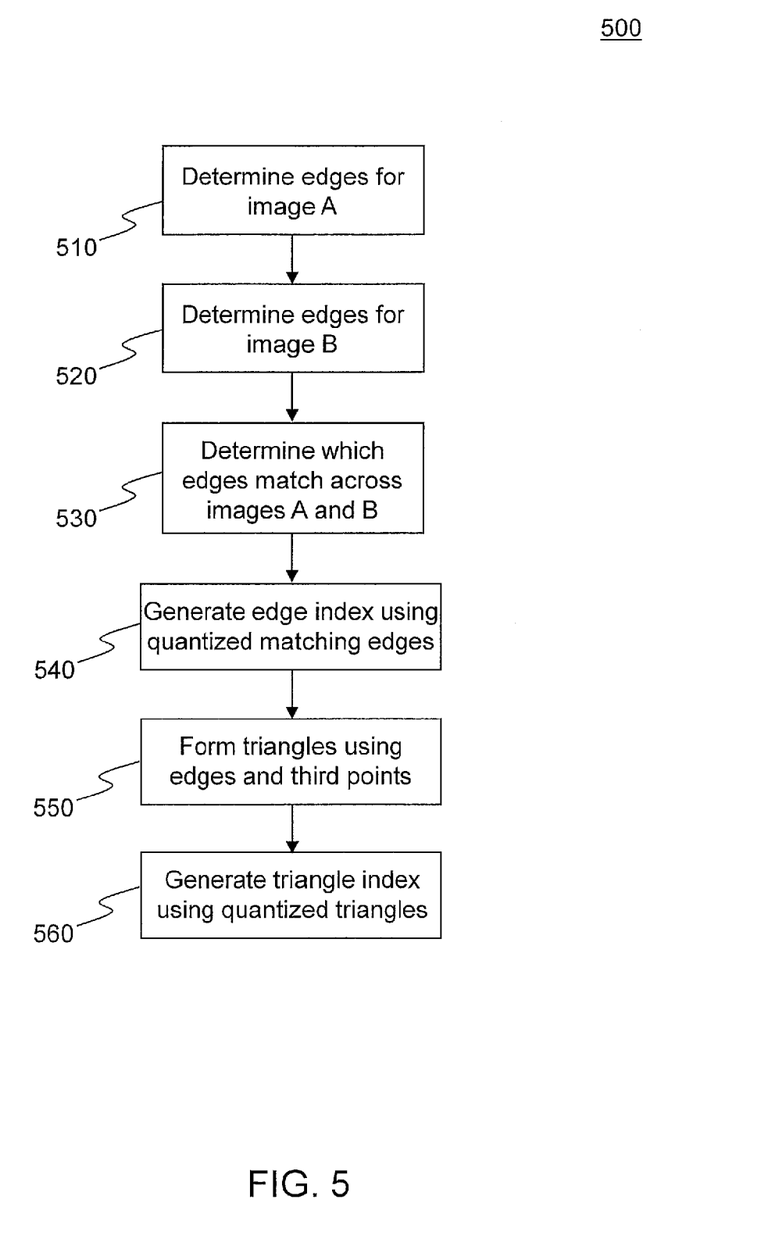
FIG. 5 is a flow diagram of an embodiment of a process to generate an edge index and a triangle index from training images.

FIG. 5 is a flow diagram of an embodiment 500 of a process to generate an edge index or a triangle index from training images A and B, such as those shown in FIG. 2, for example. At block 510, hessian-affine descriptors may be extracted from image A using any of a number of techniques, such as SIFT, for example, to detect or describe local descriptors in image A. Resulting descriptors may be quantized to determine edges. At block 520, in a similar fashion, edges may be determined for image B. As discussed above, a logo-class may be generated from two or more reference or training images, such as images A and B. At block 530, a systematic search for edges in training image A that are similar to edges in training image B may be performed. Edges that are similar are described as edges that "match across" training images. At block 540, edges that are determined to match across training images A and B for a logo-class may be collected into an edge index that includes matching edges for a plurality of logo-classes. At block 550, in a subsequent hierarchical portion of a process to index or categorize logo-classes, triangles may be formed by systematically combining edges that match across training images with third points that also match across the training images. At block 560, triangles that are determined to match across training images for a logo-class may be collected into a triangle index that includes matching triangles for a plurality of logo-classes. Of course, details of embodiment 500 are merely examples, and claimed subject matter is not so limited.

Figure 6:
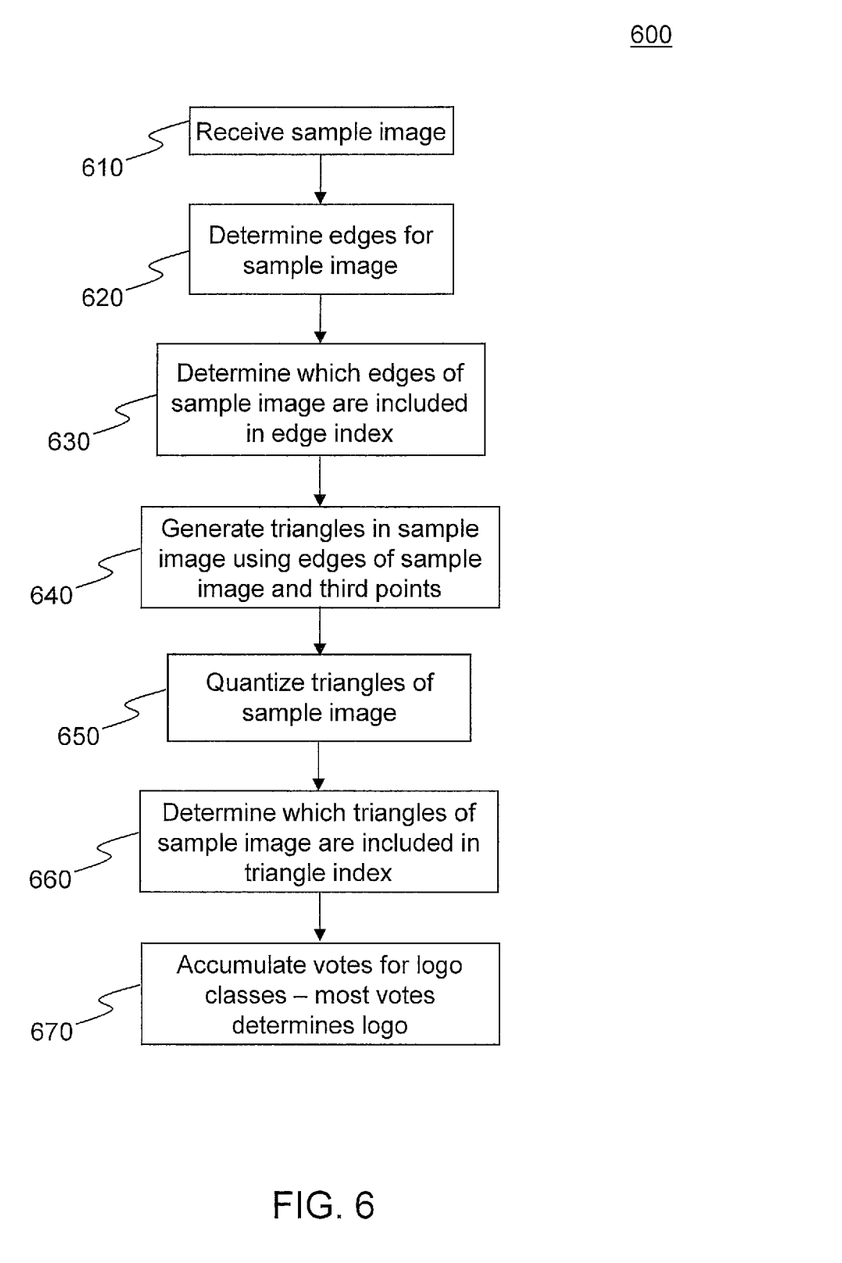
FIG. 6 is a flow diagram of an embodiment of a process to recognize a logo.

FIG. 6 is a flow diagram of an embodiment 600 of a process to determine or identify a logo. At block 610, a sample image may be received to determine whether or not the sample image includes a logo or other object. To determine whether a logo is included in a sample image, edges or triangles in the sample image may be compared to contents in edge or triangle indexes, for example. Also, to identify a logo in a sample image with respect to a reference library of logos, edges or triangles in the sample image may be determined and compared to contents in edge or triangle indexes. Because edge or triangle indexes may be generated from training images of a number of logo-classes, a logo in a sample image may be identified if the particular logo is represented by any of the logo-classes. At block 620, hessian-affine descriptors may be extracted from a sample image using any of a number of techniques, such as SIFT, for example, to detect or describe local descriptors in the sample image. Resulting descriptors may be quantized to determine edges. At block 630, a systematic search for edges in a sample image that are similar to edges in an edge index may be performed. In a subsequent hierarchical portion of a process to narrow a search to identify a logo or object in a sample image, edges of a sample image that matched edges in an edge index may be used to generate triangles using third points also included in the sample image an edge index, as at block 640. At block 650, resulting triangles may be quantized into bins, as described above. At block 660, a systematic search for triangles in a sample image that are similar to triangles in a triangle index may be performed. At block 670, using results of matching triangles, votes may be accumulated for individual logo class to compute a frequency of matches per logo class. In one particular application, a logo of a logo-class may be considered to be identified in an image if the number of votes of the logo class comprises a number that is greater than a threshold number $n_{th}$. In another particular application, a logo of a logo-class may be considered to be identified in an image if the number of votes of the logo class comprises a number that is more than f times the number of votes of a second-place logo class, for example. Otherwise, an image may be considered to contain no logo. Empirically, f may, be set to a value of about 2, $n_{th}$ may comprise a value of about 20, and a vote may comprise about 100,000 triangles, just to illustrate some non-limiting examples. Classification of a logo may be based, at least in part, on a logo-class having a number of votes. Of course, claimed subject matter is not so limited.

Given an unknown sample image, there may be no prior knowledge regarding which logo it contains (if any) and at what locations, scales, or sizes, for example. In one embodiment, a Monte Carlo method may be employed in a process to identify an object or logo or determine descriptors of an object or logo in an image. An edge index may be queried with pseudo randomly selected pairs of points out of a set of visual descriptors V of a sample image, as described above. For many queries, which happen to he outside a region where a logo may reside, a match may not be found in an edge index. On the other hand, matches may be found for queries extracted from a region where a logo is present. Compared to a number of possible combinations of points, pseudo randomly chosen pairs of points and returned matches may satisfactorily ensure that a relatively small number of edges have been found in a sample image. Found edges may comprise a part of a triangle that is in a triangle index, for example. Therefore, these matches may later serve as part of queries to a triangle index.

Because querying a hash table may be relatively fast, a relatively large number of pseudo random samples may be tested. Although a number of possible point combinations may be larger, using pseudo randomly extracted local feature pairs as queries may work well in practice. Logos covering a relatively large portion of an image may be likely to be identified relatively quickly. However, logos that are small may involve relatively many queries from a relatively small area to be successfully identified. One remedy may be to use a hybrid approach: Relatively short edges (e.g., small sizes or lengths) may be sampled using a process involving pseudo random sampling (e.g., Monte Carlo) by selecting up to 100 or so nearest neighbors that are within a distance of about 4 to 60 pixels of a given point in an image, for example. These edges may likely cover relatively small logos. Also, because queries need not be selected pseudo randomly, a relatively small number of queries (about 10,000 queries, for example) may be sufficient to cover an image thoroughly. After an image is scanned for relatively small logos, a process involving pseudo random sampling of pseudo random edges may be resumed. In a particular example, about 100,000 pseudo random edges may be sampled. Because larger logos may likely contain more local features compared to smaller logos, larger logos may also be more likely to be included if pseudo random points are selected.

In a process involving a pseudo random sampling of points, such as Monte Carlo sampling, one parameter may include a number of pseudo random samples or a number of queries to an index. A density of Monte Carlo sampling, for example, may be changed at query time. Increasing this density may affect a number of detected edges and triangles. A number of queries that may be issued to an index may correspond to a probability of detection of a particular combination of points. Of course, details of sampling of points are merely examples, and claimed subject matter is not so limited.

Figure 7:
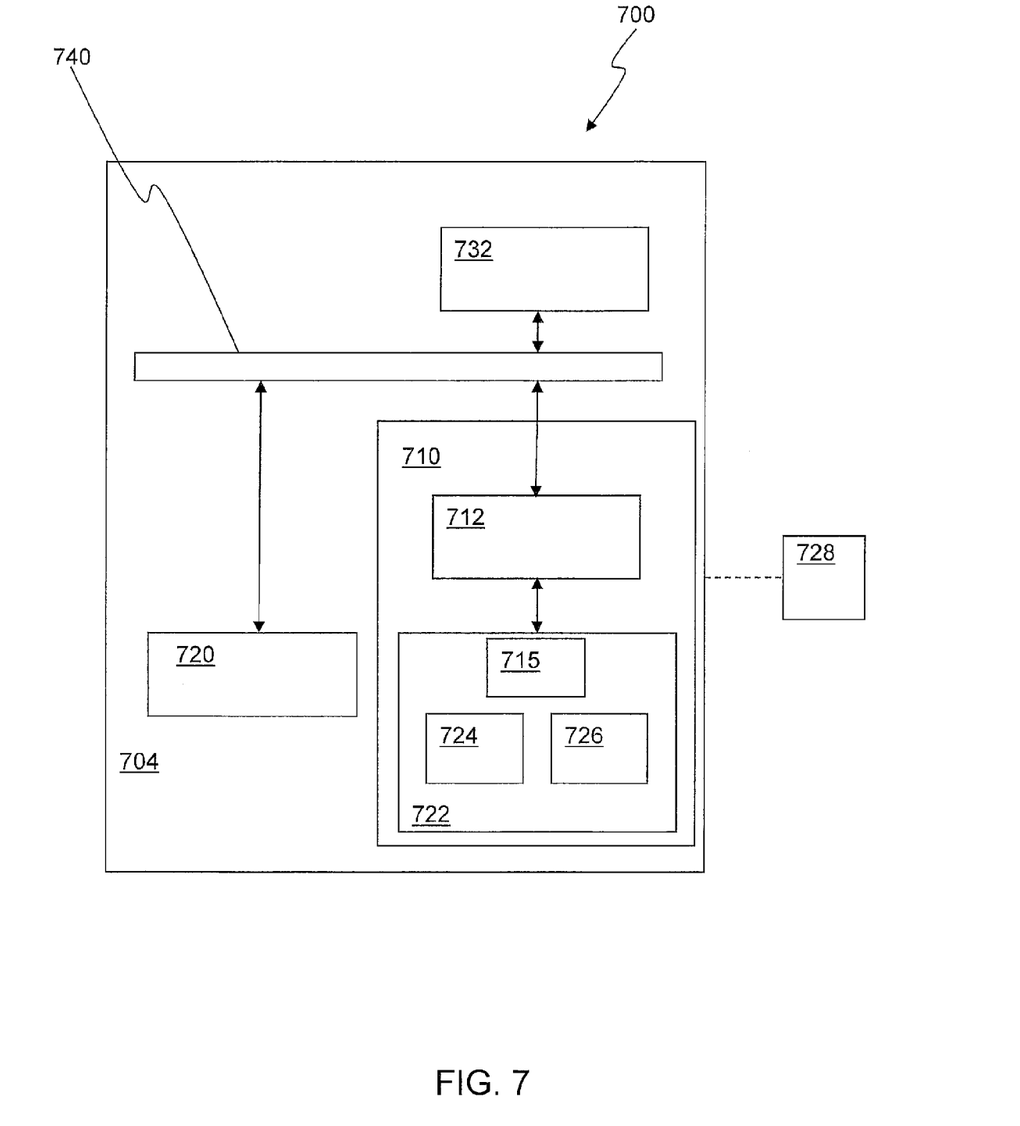
FIG. 7 is a schematic of an embodiment of a computing system.

FIG. 7 is a schematic diagram illustrating an embodiment of a computing system 700. A computing device may comprise one or more processors, for example, to execute an application or other code. For example, among other things, an application may perform process 500 or 600 described above. In a particular implementation, computing system may perform a cascaded process, wherein the cascaded process comprises comparing points extracted from a sample image to elements of a primary index, and querying a secondary index if the points correspond to elements of the primary index. In another particular implementation, computing system 700 may comprise a special purpose computing system to receive electronic signals representing an image, transform electronic signals to encode a geometric structure of local descriptors of an object in the image, and identify the object based, at least in part, on logo-classes generated from multiple training images.

A computing device 704 may be representative of any device, appliance, or machine that may be employed to manage memory device 710. Memory device 710 may include a memory controller 715 and a memory 722. By way of example, but not limitation, computing device 704 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or information storage service provider or system; or any combination thereof.

All or part of various devices shown in system 700, or processes and methods described herein, may be implemented using or otherwise including hardware, firmware, software, or any combination thereof (although this is not intended to refer to software per se). Thus, by way of example, but not limitation, computing device 704 may include at least one processing unit 720 that is operatively coupled to memory 722 via a bus 740 and memory controller 715. Processing unit 720 is representative of one or more circuits to perform at least a portion of an information computing procedure or process. For example, a process to identify an object such as a logo may include quantizing image descriptors for a particular image, searching for matches between selected groups of the quantized image descriptors and groups in a group index of a collection of logos, and, if matches occur, searching for further matches between larger groups of the quantized image descriptors and polygons in a polygon index of the collection of logos. Larger groups may include matched selected groups, for example.

By way of example but not limitation, processing unit 720 may include one or more processors, controllers, microprocessors, microcontrollers, application specific integrated circuits, digital signal processors, programmable logic devices, field programmable gate arrays, or the like, or any combination thereof. Processing unit 720 may include an operating system to communicate with memory controller 715. An operating system may, for example, generate commands to be sent to memory controller 715 over or via bus 740. Commands may comprise read or write commands, for example.

Memory 722 is representative of any information storage mechanism. Memory 722 may include, for example, a primary memory 724 or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory or one or more information storage devices or systems, such as, for example, a disk drive, an optical disc drive, a tape drive, a solid state memory drive, etc. In certain implementations, secondary memory 726 may be operatively receptive of, or otherwise able to couple to, a computer-readable medium 728. Computer-readable medium 728 may include, for example, any medium able to carry or make accessible signal information, code, or instructions for one or more devices, such as in system 700.

Computing device 704 may include, for example, an input/output 732. Input/output 732 is representative of one or more devices or features able to accept or otherwise introduce human or machine produced signal inputs, or one or more devices or features able to deliver or provide human or machine comprehendible signal outputs. By way of example but not limitation, input/output device 732 may include a display, speaker, keyboard, mouse, trackball, touch screen, signal port, etc.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions capable of being executed by a specific or special purpose system or apparatus, for example, to result in performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A method for identifying an object in a particular image, the method comprising:
   quantizing affine invariant image descriptors for the particular image;
   searching, via a computing device, for matches between selected groups of the quantized affine invariant image descriptors and groups in a group index of a collection of objects;
   using, at least in part, a pseudo random process comprising a Monte Carlo process to select the selected groups; and
   if matches occur, searching for further matches between larger groups of the quantized affine invariant image descriptors and polygons in a polygon index of the collection of objects, wherein the larger groups include the matched selected groups.

2. The method of claim 1, wherein the polygons comprise triangles, and wherein the searching for matches further comprises:
   quantizing the triangles.

3. The method of claim 2, wherein the quantized triangles comprise signal signatures that include quantized components that are based, at least in part, on positions of the affine invariant image descriptors relative to one another.

4. The method of claim 2, wherein the quantized triangles are at least approximately scale invariant.

5. The method of claim 1, wherein the groups of the quantized affine invariant image descriptors comprise pairs of the quantized affine invariant image descriptors and the larger groups of the quantized affine invariant image descriptors comprise triplets of the quantized affine invariant image descriptors.

6. The method of claim 5, wherein the triplets comprise three points of triangles in the particular image.

7. The method of claim 1, wherein the affine invariant image descriptors comprise stable points in the particular image, wherein relative positions of the stable points are substantially constant with respect to varying perspectives of the particular image.

8. The method of claim 1, wherein the identifying an object comprises identifying the object with a false positive rate that is approximately or less than $\frac{1}{200}$ that of a false negative rate.

9. An apparatus comprising:
   a computing device to perform a cascaded process, wherein the cascaded process is operable to compare affine invariant points to be extracted from a sample image to components of a primary index substantially in accordance with a pseudo random process to comprise a Monte Carlo process, and query a secondary index if the affine invariant points are to correspond to components of the primary index,
   wherein the primary index to comprise quantized pairs of points to be extracted from two or more training images, and wherein individual ones of the two or more training images to include an object and the sample image to include the object if the operation to query the secondary index produces a match among components in the secondary index and one or more quantized combinations of the affine invariant points.

10. The apparatus of claim 9, wherein the secondary index to comprise combinations of the quantized pairs of points.

11. An apparatus comprising: a special purpose computing device, the special purpose computing device to:
    transform electronic signals to encode a geometric structure of local features of an object in an image; and
    identify the object based, at least in part, on object-classes to be generated from multiple training images, wherein to identify the object comprises to:
       represent the object by a plurality of edges and triangles;
       compare the plurality of edges with a plurality of edges of a reference image of one of the object-classes via a pseudo random process; and
       for a plurality of triangles of the object to comprise an edge of the plurality of edges for which a match is to be found in the reference image, compare triangles of the object with a plurality triangles of the reference image, wherein the reference image to comprise an instance of the one of the object-classes; and
       wherein the pseudo random process to comprise a Monte Carlo process.

12. The apparatus of claim 11, wherein the multiple training images to include a collection of objects.

13. The apparatus of claim 11, wherein the geometric structure to comprise hessian-affine features.

14. The apparatus of claim 11, wherein the special purpose computing device further to
    select advertisements based, at least in part, on the identification of the object.

15. The apparatus of claim 14, wherein the selected advertisements to include the identified object.

16. The apparatus of claim 15, wherein the identified object to comprise affine invariant points.

* * * * *